United States Patent
Arulesan et al.

(10) Patent No.: US 9,934,547 B2
(45) Date of Patent: Apr. 3, 2018

(54) METHOD AND SYSTEM FOR REDUCING THE NUMBER OF DRAW COMMANDS ISSUED TO A GRAPHICS PROCESSING UNIT (GPU)

(71) Applicant: QUALCOMM Incorporated, San Diego, CA (US)

(72) Inventors: Veluppillai Arulesan, Toronto (CA); Shiu Wai Hui, Richmond Hill (CA); Stewart Chao, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 14/866,411

(22) Filed: Sep. 25, 2015

(65) Prior Publication Data

US 2016/0104264 A1 Apr. 14, 2016

Related U.S. Application Data

(60) Provisional application No. 62/062,066, filed on Oct. 9, 2014.

(51) Int. Cl.
| | |
|---|---|
| *G06T 1/20* | (2006.01) |
| *G06T 11/00* | (2006.01) |
| *G06T 15/04* | (2011.01) |
| *G06T 15/00* | (2011.01) |

(52) U.S. Cl.
CPC .............. *G06T 1/20* (2013.01); *G06T 11/001* (2013.01); *G06T 15/005* (2013.01); *G06T 15/04* (2013.01)

(58) Field of Classification Search
CPC .... G06T 1/20; G06T 15/005; G06T 21/44012
See application file for complete search history.

(56) References Cited

U.S. PATENT DOCUMENTS

| | | | | |
|---|---|---|---|---|
| 7,847,800 B2* | 12/2010 | Harper | ...................... | G06T 1/20 345/502 |
| 8,477,142 B2* | 7/2013 | Dufourd | ............. | G06F 17/3028 345/522 |
| 9,508,181 B2* | 11/2016 | Kim | ........................ | G06T 15/00 |
| 2014/0184606 A1* | 7/2014 | de Richebourg | ......... | G06T 1/60 345/440 |

\* cited by examiner

*Primary Examiner* — Antonio A Caschera
(74) *Attorney, Agent, or Firm* — Haynes and Boone, LLP

(57) ABSTRACT

An example method of reducing a number of draw commands issued to a GPU includes generating a first scene graph including a first set of nodes for rendering objects in a first frame and generating a second scene graph including a second set of nodes for rendering objects in a second frame. The method further includes identifying a common portion of the first and second frames. The common portion corresponds to a plurality of nodes in the first and second scene graphs that are the same. The method also includes replacing the plurality of nodes in the second scene graph with a single node including a single draw command that represents draw commands in the plurality of nodes. The single draw command causes the GPU to display the texture in the second frame. The texture is based on a rendering of the common portion in the first frame.

20 Claims, 8 Drawing Sheets

METHOD AND SYSTEM FOR REDUCING THE NUMBER OF DRAW COMMANDS ISSUED TO A GRAPHICS PROCESSING UNIT (GPU)

CROSS REFERENCE TO RELATED APPLICATIONS

This application claims the benefit of priority from U.S. provisional patent application No. 62/062,066, filed Oct. 9, 2014, which is incorporated herein by reference.

FIELD OF DISCLOSURE

The present disclosure generally relates to graphics rendering, and more particularly to reducing the number of draw commands issued to a graphics processing system.

BACKGROUND

Computing devices may be equipped with one or more high-performance graphics processing units (GPUs) that provide high performance with regard to computations and graphics rendering. Computing devices may use a GPU to accelerate the rendering of graphics data for display. Examples of such computing devices may include a computer workstation, mobile phones (e.g., smartphones), embedded systems, personal computers, tablet computers, and video game consoles.

Rendering generally refers to the process of converting a three-dimensional (3D) graphics scene, which may include one or more 3D graphics objects, into two-dimensional (2D) rasterized image data. In particular, GPUs may include a 3D rendering pipeline to provide at least partial hardware acceleration for the rendering of a 3D graphics scene. The 3D graphics objects in the scene may be subdivided by a graphics application into one or more 3D graphics primitives (e.g., points, lines, triangles, patches, etc.), and the GPU may convert the 3D graphics primitives of the scene into 2D rasterized image data.

BRIEF SUMMARY

Methods, systems, and techniques for reducing a number of draw commands issued to a graphics processing unit (GPU) are provided.

According to an embodiment, a method of reducing a number of draw commands issued to a GPU includes generating a first scene graph including a first set of nodes. The first set of nodes is based on a first set of draw commands for rendering one or more objects in a first frame. The method also includes generating a second scene graph including a second set of nodes. The second set of nodes is based on a second set of draw commands for rendering one or more objects in a second frame. The method further includes identifying a common portion of the first and second frames. The common portion corresponds to a plurality of nodes in the first and second scene graphs that are the same. The method also includes replacing the plurality of nodes in the second scene graph with a single node including a single draw command representing draw commands in the plurality of nodes. The single draw command causes the GPU to retrieve a texture from a memory and display the texture in the second frame. The texture is based on a rendering of the common portion in the first frame.

A system for reducing a number of draw commands issued to a GPU includes a scene graph generator that generates a first scene graph and a second scene graph. The first scene graph includes a first set of nodes based on a first set of draw commands for rendering one or more objects in a first frame. The second scene graph includes a second set of nodes based on a second set of draw commands for rendering one or more objects in a second frame. The system also includes an optimizer that identifies a common portion of the first and second frames. The optimizer replaces a plurality of nodes in the second scene graph with a single node including a single draw command representing draw commands in the plurality of nodes. The common portion corresponds to the plurality of nodes in the first and second scene graphs that are the same. The single draw command causes the GPU to retrieve a texture from a memory and display the texture in the second frame. The texture is based on a rendering of the common portion in the first frame.

According to another embodiment, a computer-readable medium has stored thereon computer-executable instructions for performing operations including: generating a first scene graph including a first set of nodes, the first set of nodes based on a first set of draw commands for rendering one or more objects in a first frame; generating a second scene graph including a second set of nodes, the second set of nodes based on a second set of draw commands for rendering one or more objects in a second frame; identifying a common portion of the first and second frames, the common portion corresponding to a plurality of nodes in the first and second scene graphs that are the same; and replacing the plurality of nodes in the second scene graph with a single node including a single draw command representing draw commands in the plurality of nodes, where the single draw command causes the GPU to retrieve a texture from a memory and display the texture in the second frame, and where the texture is based on a rendering of the common portion in the first frame.

According to another embodiment, an apparatus for reducing a number of draw commands issued to a GPU includes means for generating a first scene graph including a first set of nodes, the first set of nodes based on a first set of draw commands for rendering one or more objects in a first frame. The apparatus also includes means for generating a second scene graph including a second set of nodes, the second set of nodes based on a second set of draw commands for rendering one or more objects in a second frame. The apparatus further includes means for identifying a common portion of the first and second frames, the common portion corresponding to a plurality of nodes in the first and second scene graphs that are the same. The apparatus also includes means for replacing the plurality of nodes in the second scene graph with a single node including a single draw command representing draw commands in the plurality of nodes. The single draw command causes the GPU to retrieve a texture from a memory and display the texture in the second frame. The texture is based on a rendering of the common portion in the first frame.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
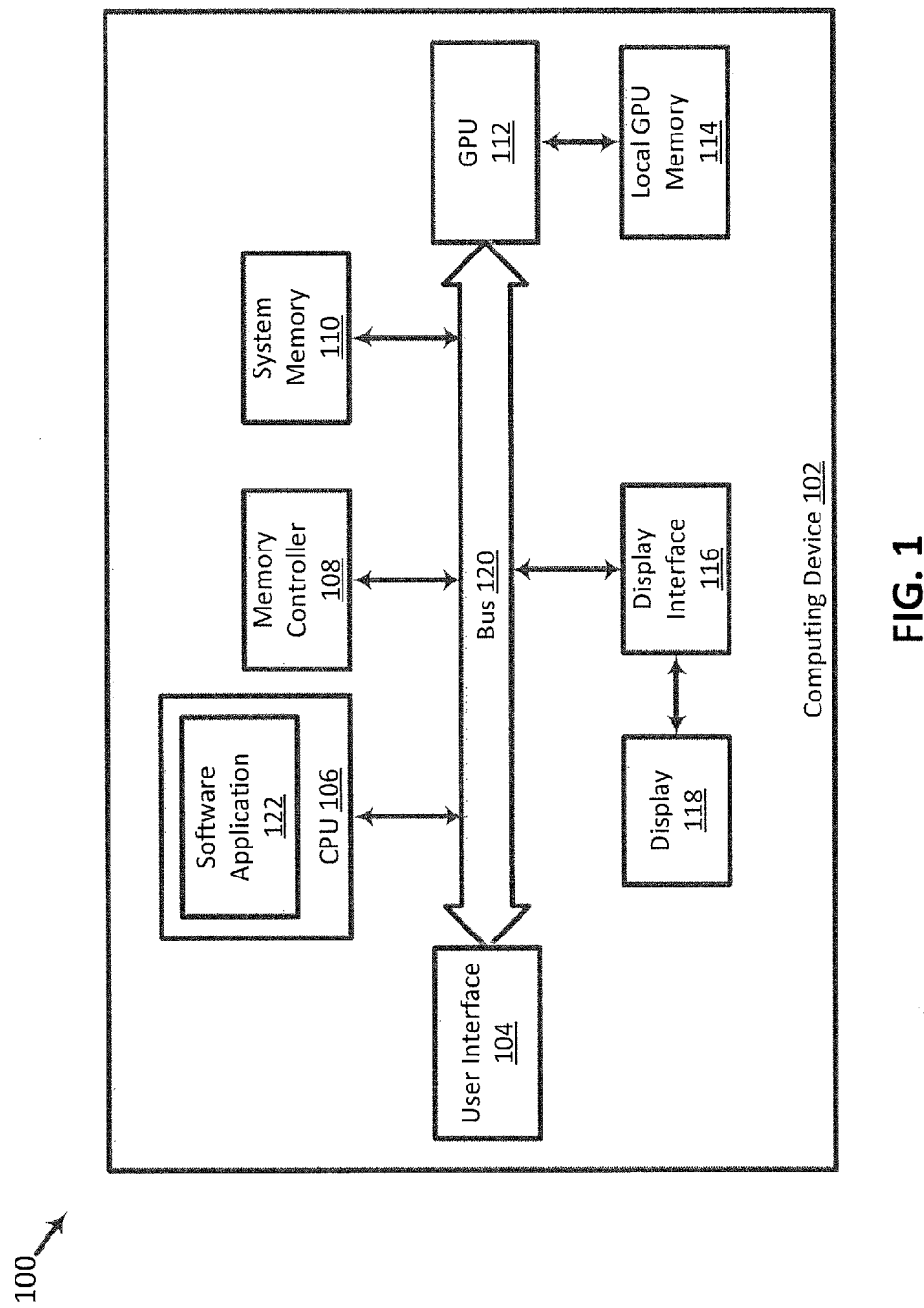
FIG. 1 is a block diagram illustrating a computing device that may be used to implement the rendering techniques of this disclosure, according to some embodiments.

I. Overview
II. Example System Architectures
III. Optimize the Number of Draw Commands Issued to the GPU
  A. Optimize Within the Same Frame
  B. Optimize Across Frames
    1. Identify a Common Portion
    2. Store a Single Texture that Represents the Nodes in the Common Portion
    3. Retrieve the Single Texture from Local GPU Memory in Subsequent Frames
IV. Example Method I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Rendering may refer to the process of converting 3D graphics primitives that correspond to 3D objects in a graphics scene into 2D rasterized image data. A computing device may use a graphics processing unit (GPU) including a 3D graphics rendering pipeline to accelerate the rendering of graphics primitives. In particular, the 3D graphics rendering pipeline may include processing stages that are configured to render 3D graphics primitives. The processing stages may include programmable processing stages and fixed-function processing stages. Programmable processing stages may be configured to execute a user-specified program that may be compiled and loaded onto the GPU. Fixed-function processing stages may be hardwired to perform one or more functions, which may be configurable.

Software code may not be written such that the code is optimized for running on a particular device, which may result in sub-optimal performance and power profiles. For example, coding for the Web tends to be in higher level languages and is meant to be device and platform agnostic. As such, Web developers may write code that is not conducive to optimizing performance and power on mobile browsers and devices. Currently, Web engines redraw every single primitive and redraw sections of the frame for every single frame. The computing devices that execute these Web engines may consume a lot of power and suffer from poor performance. For example, in Hypertext Markup Language (HTML) 5 Canvas elements, a large portion of a scene that is rendered on the canvas may be the same but is still drawn in every single frame. Additionally, similar primitives may be drawn multiple times in every frame with transformations. Although this may not be much of a problem on desktop personal computers (PCs), which have "infinite power" because of their lack of battery constraints and also have much higher computational capabilities than mobile devices, high power consumption and performance loss may be a problem for mobile devices. It should also be understood that the present disclosure may be used for any type of computing device, including PCs and such. It may be desirable to reduce the amount of redundant work that is being performed at the computing device in order to improve performance and power consumption on the computing device.

The present disclosure provides techniques to improve the power and performance profiles of computing devices and to reduce the memory bandwidth for data transfer between the CPU and GPU. In an embodiment, a computing device includes an optimizer that identities re-used primitives as well as unchanging scenery in a frame by converting the frame into a scene graph and re-using existing rendered content from previous frames or the current frame instead of re-generating the frame or primitives multiple times. An advantage of such an embodiment may allow for improved performance and power consumption.

II. Example System Architectures

FIG. 1 is a block diagram 100 illustrating a computing device 102 that may be used to implement the rendering techniques of this disclosure, according to some embodiments. Computing device 102 may include a personal computer, a desktop computer, a laptop computer, a computer workstation, a video game platform or console, a wireless communication device (e.g., a mobile telephone, a cellular telephone, a satellite telephone, and/or a mobile telephone handset), a handheld device such as a portable video game device or a personal digital assistant (PDA), a personal music player, a video player, a television, a television set-top box, or any other type of device that processes and/or displays graphical data.

As illustrated in the example of FIG. 1, computing device 102 includes a user interface 104, a CPU 106, a memory controller 108, a system memory 110, a graphics processing unit (GPU) 112, a local GPU memory 114, a display interface 116, a display 118, and a bus 120. User interface 104, CPU 106, memory controller 108, GPU 112 and display interface 116 may communicate with each other using bus 120. It should be noted that the specific configuration of buses and communication interfaces between the different components shown in FIG. 1 are examples, and other configurations of computing devices and/or other graphics processing systems with the same or different components may be used to implement the techniques of this disclosure.

CPU 106 may include a general-purpose or a special-purpose processor that controls operation of computing device 102. A user may provide input to computing device 102 to cause CPU 106 to execute one or more software applications. The software applications that execute on CPU 106 may include, for example, an operating system, a software application 122 (e.g., a browser, a word processor application, an email application, a spread sheet application, a video game application, a graphical user interface (GUI) application, or another program). The user may provide input to computing device 102 via one or more input devices (not shown) such as a keyboard, a mouse, a microphone, a touch pad or another input device that is coupled to computing device 102 via user interface 104.

The software applications that execute on CPU 106 may include one or more graphics rendering instructions that instruct GPU 112 to cause the rendering of graphics data to display 118. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. To process the graphics rendering instructions, CPU 106 may issue one or more graphics rendering commands to GPU 112 to cause GPU 112 to perform some or all of the rendering of the graphics data. In some examples, the graphics data to be rendered may include a list of graphics primitives, e.g., points, lines, triangles, quadrilaterals, triangle strips, etc.

Memory controller 108 facilitates the transfer of data going into and out of system memory 110. For example, memory controller 108 may receive memory read and write commands, and service such commands with respect to system memory 110 in order to provide memory services for the components in computing device 102. Memory controller 108 is communicatively coupled to system memory 110. Although memory controller 108 is illustrated in the example computing device 102 of FIG. 1 as being a processing module that is separate from both CPU 106 and system memory 110, in other examples, some or all of the functionality of memory controller 108 may be implemented on one or both of CPU 106 and system memory 110.

System memory 110 may store program modules and/or instructions that are accessible for execution by CPU 106 and/or data for use by the programs executing on CPU 106. For example, system memory 110 may store user applications and graphics data associated with the applications. System memory 110 may additionally store information for use by and/or generated by other components of computing device 102. For example, system memory 110 may act as a device memory for GPU 112 and may store data to be operated on by GPU 112 as well as data resulting from operations performed by GPU 112. For example, system memory 110 may store any combination of texture buffers, depth buffers, stencil buffers, vertex buffers, frame buffers, or the like. In addition, system memory 110 may store command streams for processing by GPU 112. System memory 110 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 112 may be configured to perform graphics operations to render one or more graphics primitives to display 118 and to texture map an image to a pixel for display. Thus, if software application 122 executing on CPU 106 requires graphics processing, CPU 106 may provide graphics commands and graphics data to GPU 112 for rendering to display 118. The graphics commands may include draw commands, GPU state programming commands, memory transfer commands, general-purpose computing commands, kernel execution commands, etc. In some examples, CPU 106 may provide the commands and graphics data to GPU 112 by writing the commands and graphics data to memory 110, which may be accessed by GPU 112. In some examples, GPU 112 may be further configured to perform general-purpose computing for applications executing on CPU 106.

GPU 112 may, in some instances, be built with a highly-parallel structure that provides more efficient processing of vector operations than CPU 106. For example, GPU 112 may include a plurality of processing units that are configured to operate on multiple vertices, control points, pixels and/or other data in a parallel manner. The highly parallel nature of GPU 112 may, in some instances, allow GPU 112 to render graphics images (e.g., GUIs and two-dimensional (2D) and/or three-dimensional (3D) graphics scenes) onto display 118 more quickly than rendering the images using CPU 106. In addition, the highly parallel nature of GPU 112 may allow GPU 112 to process certain types of vector and matrix operations for general-purposed computing applications more quickly than CPU 106.

GPU 112 may, in some instances, be integrated into a motherboard of computing device 102. In other instances, GPU 112 may be present on a graphics card that is installed in a port in the motherboard of computing device 102 or may be otherwise incorporated within a peripheral device configured to interoperate with computing device 102. In further instances, GPU 112 may be located on the same microchip as CPU 106 forming a system on a chip (SoC). GPU 112 may include one or more processors, such as one or more microprocessors, application specific integrated circuits (ASICs), field programmable gate arrays (FPGAs), digital signal processors (DSPs), or other integrated or discrete logic circuitry.

GPU 112 may be directly coupled to Local GPU memory 114. Thus, GPU 112 may read data from and write data to Local GPU memory 114 without necessarily using bus 120. In other words, GPU 112 may process data locally using a local storage, instead of off-chip memory. This allows GPU 112 to operate in a more efficient manner by reducing the need of GPU 112 to read and write data via bus 120, which may experience heavy bus traffic. In some examples, GPU 112 does not include a separate cache and uses system memory 110 via bus 120 for memory storage and retrieval. Local GPU memory 114 may include one or more volatile or non-volatile memories or storage devices, such as, e.g., random access memory (RAM), static RAM (SRAM), dynamic RAM (DRAM), etc.

CPU 106 and/or GPU 112 may store rendered image data in a frame buffer that is allocated within system memory 110. The software application that executes on CPU 106 may store the image data (e.g., texel colors, width, height, and color depth) in system memory 110. The image data may be loaded from an image file or generated using code. Display interface 116 may retrieve the data from the frame buffer and configure display 118 to display the image represented by the rendered image data. In some examples, display interface 116 may include a digital-to-analog converter (DAC) that is configured to convert the digital values retrieved from the frame buffer into an analog signal consumable by display 118. In other examples, display interface 116 may pass the digital values directly to display 118 for processing.

Display 118 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 118 may be integrated within computing device 102. For instance, display 118 may be a screen of a mobile telephone handset or a tablet computer. Alternatively, display 118 may be a stand-alone device coupled to computing device 102 via a wired or wireless communications link. For instance, display 118 may be a computer monitor or flat panel display coupled to a personal computer via a cable or wireless link.

Bus 120 may be implemented using any combination of bus structures and bus protocols including first, second, and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 120 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AFIB), an AMBA Advanced Peripheral Bus (APB), and an AMBA Advanced eXentisible Interface (AXI) bus. Other types of bus structures and protocols may also be used.

Figure 2:
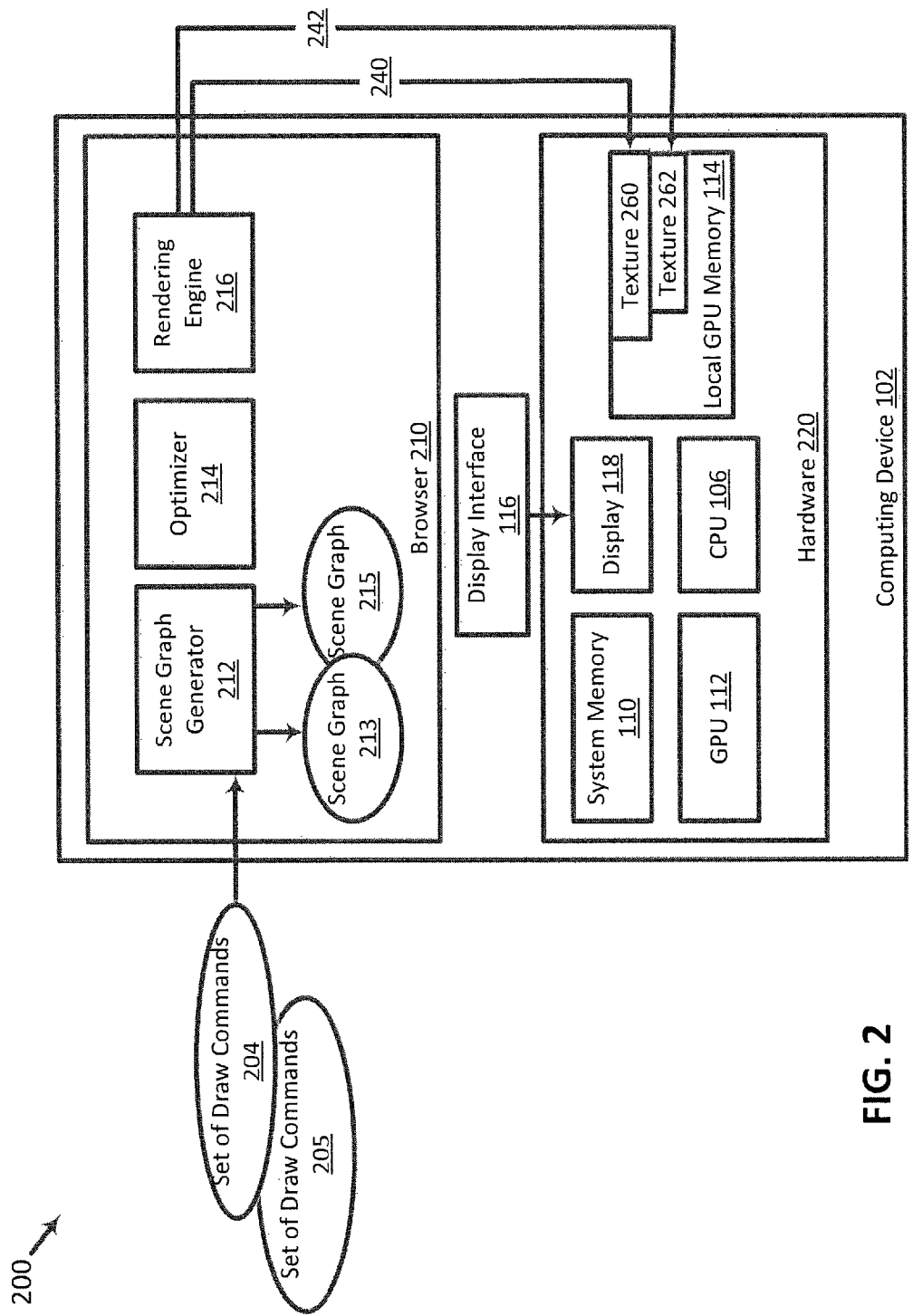
FIG. 2 is a block diagram illustrating a computing device that reduces the number of draw commands issued to a graphics processing unit (GPU), according to some embodiments.

FIG. 2 is a block diagram 200 illustrating a computing device that reduces the number of draw commands issued to GPU 112, according to some embodiments. In FIG. 2, CPU 106 is communicatively coupled to GPU 112 and system memory 110, and GPU 112 is communicatively coupled to CPU 106 and system memory 110. GPU 112 may, in some examples, be integrated onto a motherboard with CPU 106. In additional examples, GPU 112 may be implemented on a graphics card that is installed in a port of a motherboard that includes CPU 106. In further examples, GPU 112 may be incorporated within a peripheral device that is configured to interoperate with CPU 106. In additional examples, GPU 112 may be located on the same microchip as CPU 106 forming a system on a chip (SoC).

Computing device 102 includes a browser 210 and hardware 220. Hardware 220 includes CPU 106, GPU 112, local GPU memory 114, display 118, and system memory 110. CPU 106 is configured to execute a software application such as a browser 210. Browser 210 may include one or more instructions that cause graphics images to be displayed and/or one or more instructions that cause a non-graphics task (e.g., a general-purposed computing task) to be performed on GPU 112. Although browser 210 may be described as the software application that issues instructions to GPU 112, it should be understood that any software application executable in computing device 102 and that processes and/or displays graphical data may issue the instructions to GPU 112.

III. Optimize the Number of Draw Commands Issued to the GPU

Browser 210 includes a scene graph generator 212, optimizer 214, and rendering engine 216. Browser 210 receives one or more sets of draw commands. A draw command may instruct GPU 112 to render a geometry defined by a group of one or more vertices (e.g., defined in a vertex buffer) stored in system memory 110 or to draw content of a texture onto display 118. In FIG. 2, browser 210 receives a first set of draw commands 204 and a second set of draw commands 205. Each set of draw commands is specific to a frame and includes commands to render one or more objects in the frame.

In some embodiments, scene graph generator 212 and optimizer 214 operate as a "middle layer" that sits between the one or more received sets of draw commands and rendering engine 216. In an example, the "middle layer" may intercept draw commands before they are sent to rendering engine 216 and may perform operations to optimize the rendering of objects by rendering engine 216 and/or GPU 112. Each set of draw commands is specific to a frame, and scene graph generator 212 may generate a scene graph for each frame. The scene graph contains a set of nodes based on the respective set of draw commands. A node in a scene graph may include a draw command and/or data associated with the draw command. The nodes included in a scene graph may be organized in a tree structure.

In FIG. 2, scene graph generator 212 may receive set of draw commands 204 and generate a scene graph 213 based on the set of draw commands. Scene graph generator 212 may store scene graph 213 (each of the commands in set of draw commands 204 and the data associated with the commands) in system memory 110 or a local cache (not shown). Additionally, scene graph generator 212 may receive set of draw commands 205 and generate a scene graph 215 based on set of draw commands 205. Scene graph generator 212 may store scene graph 215 (each of the commands in set of draw commands 205 and the data associated with the commands) in system memory 110 or a local cache. Scene graph generator 212 may store scene graphs in system memory 110 so that they may be compared to subsequently generated scene graphs.

Figure 3A:
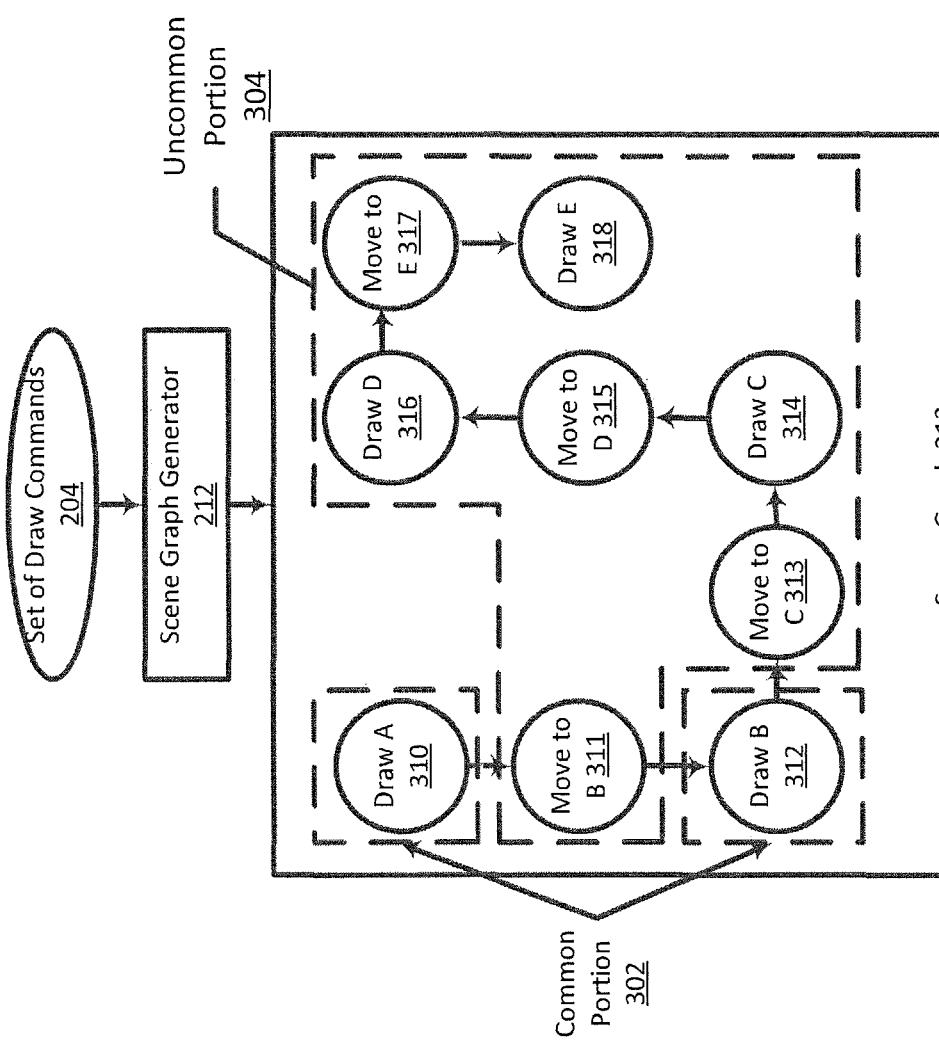
FIG. 3A is an illustration of a scene graph based on a set of draw commands, according to some embodiments.
Figure 3C:
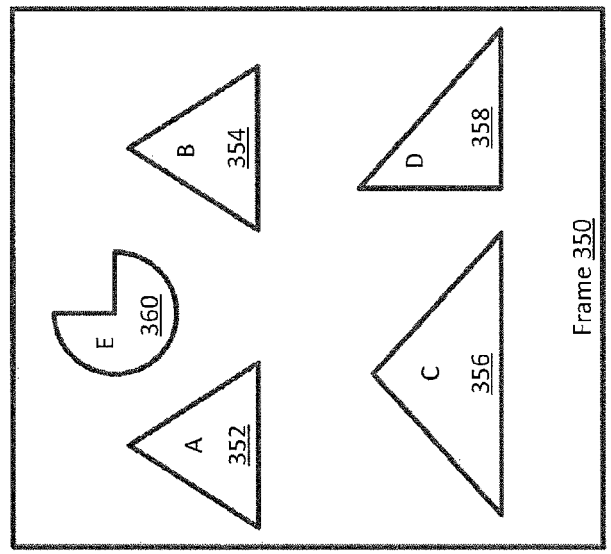
FIG. 3C is an illustration of objects rendered in a frame based on the updated scene graph in FIG. 3B, according to some embodiments.
Figure 3B:
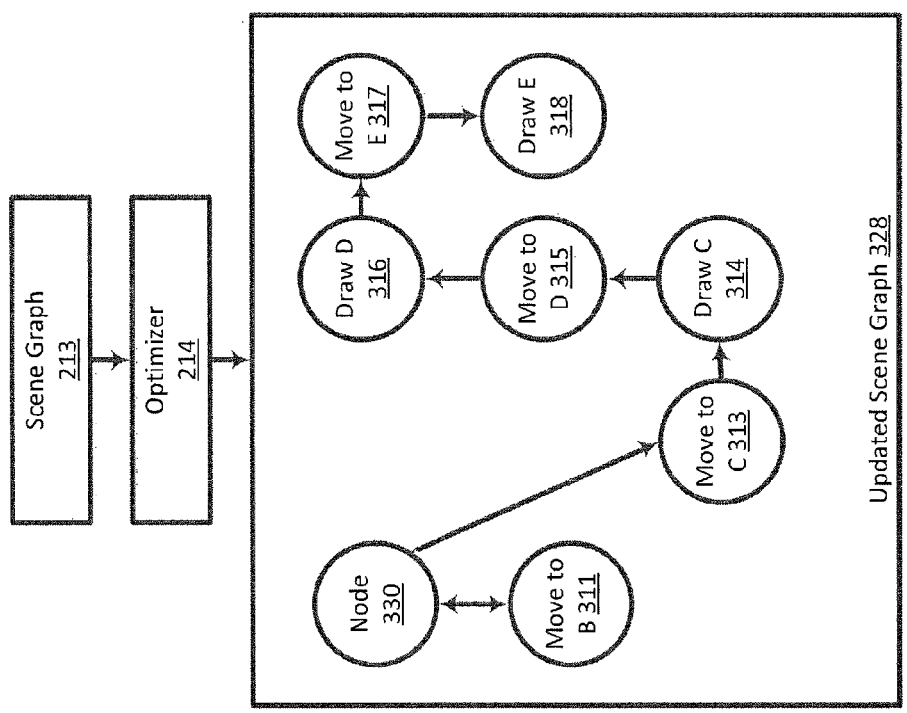
FIG. 3B is an illustration of an updated scene graph based on replacing matching nodes in the scene graph in FIG. 3A with a single node, according to some embodiments.

FIG. 3A is an illustration of scene graph 213 based on a set of draw commands 204, according to some embodiments. FIG. 3B is an illustration of an updated scene graph 328 based on replacing matching nodes in scene graph 213 with a single node, according to some embodiments. FIG. 3C is an illustration of objects rendered in a frame 350 based on updated scene graph 328, according to some embodiments. Frame 350 includes an object "A" 352, object "B" 354, object "C" 356, object "D" 358, and object "E" 360. Object "A" 352 and object "B" 354 are the same shape.

In FIG. 3A, scene graph generator 212 may process set of draw commands 204 and generate scene graph 213 containing nodes 310-318 based on set of draw commands 204. Nodes 310-318 include draw commands and/or data associated with the draw commands in set of draw commands 204. Each node in scene graph 213 has one or more attributes corresponding to an object for rendering in frame 350. Optimizer 214 may optimize the set of draw commands included in scene graph 213 before it is sent to rendering engine 216 for further processing. Optimizer 214 may optimize a current set of draw commands included in scene graph 213 by comparing nodes within the current scene graph to identify commonalities among the nodes. A plurality of nodes having the same attribute value for one or more common attributes may be determined to have a commonality and may be referred to as matching nodes. The current set of draw commands refers to the set of draw commands that is to be translated by rendering engine 216 and sent to GPU 112 for rendering. The current scene graph refers to the scene graph that includes the current set of draw commands. The set of draw commands received by scene graph generator 212 is in an intermediate format that is not understandable by GPU 112. The intermediate draw commands are converted by rendering engine 216 into a final format that is understandable by GPU 112. GPU 112 may invoke the final draw commands to render a frame.

Each node in the plurality of nodes includes one or more attributes, and each attribute has an attribute value. In an example, an attribute of a node may be a shape of an object (e.g., triangle, square, quadrilateral) that is drawn based on the draw command included in the node, a location on display 118 at which the object corresponding to the node will be rendered on the display, or an execution command. In some embodiments, optimizer 214 compares attribute values of one or more common attributes of a plurality of nodes and determines, based on the comparison of the attribute values, whether the plurality of nodes match. The plurality of nodes may match if attribute values of a common attribute of the plurality of nodes are the same. Optimizer 214 identifies a plurality of nodes in one or more scene graphs and determines whether the plurality of nodes matches.

A. Optimize within the Same Frame

Optimizer 214 may optimize nodes within the same scene graph for rendering in a single frame. Optimizer 214 may identify nodes 310-318 in scene graph 213, compare attribute values of one or more common attributes of nodes 310-318, and optimize the set of draw commands included in scene graph 213 before they are sent to rendering engine 216 for further processing.

Optimizer 214 may identify a common portion of scene graph 213 including a plurality of nodes that match and/or identify an uncommon portion of scene graph 213 including a plurality of nodes that do not match. A common portion may refer to nodes in one or more scene graphs that remain the same. In an example, the common portion corresponds to a plurality of nodes in the same scene graph. In another example, the common portion corresponds to a plurality of nodes across sequential scene graphs. Optimizer 214 may compare attribute values of one or more common attributes of nodes 310-318 and determine, based on the comparison of attribute values, which nodes match. In an example, nodes 310 and 312 may each have a common attribute "shape" that has the same value (e.g., "triangle1"). Node 311 includes a "location" attribute that includes where on display 118 object "B" 354 should be drawn. In such an example, nodes 310 and 312 have attribute values that are the same for one or more common attributes of nodes 310 and 312. In this example, nodes 310 and 320 represent an object that has the same shape but rendered at different locations on display 118, and optimizer 214 may determine that nodes 310 and 312 have a commonality.

Each node that matches another node in a scene graph may include a draw command or data associated with a draw command (e.g., location on display 118). In response to determining that nodes 310 and 312 match, optimizer 214 replaces matching nodes 310 and 312 in scene graph 213 with a single node having a single draw command. FIG. 3B is an illustration of updated scene graph 328 based on replacing matching nodes 310 and 312 in scene graph 213 with a single node 330, according to some embodiments. In an example, optimizer 214 replaces the draw commands in nodes 310 and 312 with a single draw command that represents object A "352" (or object B "354"), and places this single draw command in node 330. Optimizer 214 updates scene graph 213 by replacing the plurality of matching nodes with single node 330, which may also include pointer 240 to texture 260. Optimizer 214 keeps track of the textures and the nodes that contribute to that texture. In some examples, optimizer 214 associates texture 260 with node 310, node 312, and/or node 330. In some examples, optimizer 214 associates texture 260 with the draw command included in node 310, node 312, and/or node 330.

Optimizer 214 may execute node 311 to execute the move command. Node 311 interacts with node 330 and is used to translate the new position for node 312 using the same texture 260 as node 310. In an example, node 310 includes attribute and attribute value "shape=triangle1" and node 312 includes attribute and attribute value "shape=triangle1." In this example, node 330 may include "shape=triangle1." The location information is embedded inside node 312 and will be extracted by the rendering engine 216, which provides this information to GPU 112 in a format that is understandable by the GPU. Updated scene graph 328 includes fewer nodes than scene graph 213.

Optimizer 214 may store scene graph 213 and/or updated scene graph 328 in system memory 110 or a local cache for later comparisons. As illustrated in FIG. 3A, scene graph 213 includes a common portion 302 including nodes 310 and 312, which match and have a commonality. Scene graph 213 also includes an uncommon portion 304 including nodes 311 and 313-318, which do not match and do not have a commonality among them.

The draw commands included in updated scene graph 328 are in an intermediate format and are not yet in a format that is understandable by GPU 112, Optimizer 214 passes updated scene graph 328 to rendering engine 216 to convert the intermediate draw commands included in updated scene graph 328 into a final format that is understandable by GPU 112. Updated scene graph 328 contains fewer nodes than scene graph 213. Rendering engine 216 may process the nodes in the common portion and the nodes in the uncommon portion of scene graph 213 separately. Rendering engine 216 renders the single draw command included in node 330, which represents the objects corresponding to matching nodes 310 and 312, into a single texture 260 and stores the single texture into local GPU memory 114 at an address (see FIG. 2). Additionally, rendering engine 216 maintains a pointer 240 to the address in local GPU memory 114 that stores the single texture.

Rendering engine 216 converts the draw commands included in updated scene graph 328 into a format that is understandable by GPU 112. The single draw command in node 330 that is provided from rendering engine 216 to GPU 112 may include a pointer 240 to the address in local GPU memory 114 that stores the single texture 260. Rendering engine 216 issues a command to GPU 112 that causes GPU 112 to use the previously rendered single texture 260 referenced by pointer 240 to render frame 350 and render the object in frame 350 N number of times, where N is a whole number. In this example, N may be two, where the object is drawn twice (once to represent object "A" 352 and another time to represent object "B" 354). Accordingly, rendering engine 216 may render object "A" 352 into single texture 260, store the single texture in local GPU memory 114, and provide to GPU 112 two different locations on display 118 at which to render object "A" 352 and object "B" 354 in frame 350 using single texture 260. In this way, the final draw command that is generated by rendering engine 216 may be re-used in the future rather than converting the same intermediate draw commands in a scene graph into a format that is understandable by GPU 112.

As discussed, scene graph 328 includes a node 330 having a single draw command representing the multiple draw commands for drawing object "A" 352 and object "B" 354 on display 118. FIG. 3C is an illustration of frame 350 that is rendered based on updated scene graph 328 in FIG. 3B, in accordance with some embodiments. GPU 112 may receive one or more instructions from rendering engine 216 that causes GPU 112 to draw object "A" 352 and object "B" 354 at the locations as shown in frame 350. In some examples, the one or more instructions from rendering engine 216 causes GPU 112 to retrieve single texture 260 from local GPU memory 114 and render this single texture in frame 350 at the two specified locations on display 118, thus reducing the memory bandwidth for data transfer between CPU 106 and GPU 112 and also reducing CPU cycles. GPU 112 GPU 112 also renders the draw commands converted by rendering engine 216 and based on nodes 311 and 313-318 (in uncommon portion 304 of scene graph 213) in frame 350.

B. Optimize Across Frames

Optimizer 214 may optimize the number of nodes in a current scene graph based on common portions of sequential frames. For example, optimizer 214 may compare nodes included in the current scene graph with nodes included in the previous scene graph to identify commonalities among the nodes across scene graphs and thus across frames. The previous scene graph has already been processed by rendering engine 216 and may be retrieved from system memory 110 for comparing with other scene graphs. Rather than re-render every frame regardless of whether sequential frames have common portions, it may be desirable to identify the unchanged content across frames and render this unchanged content into a texture for later use. Portions of rendered frames may be isolated and those portions that are common or redundant across frames may be replaced with a single texture going forward.

For example, optimizer 214 may compare frames M and M+1 to each other and identify a common portion of the frames. Rendering engine 216 may render this common portion into a single texture and store it in local GPU memory 114. If a subsequent frame M+2 includes the common portion, rather than re-render the objects in the common portion in frame M+2, optimizer 214 may retrieve the single texture and display this on display 118. As such, rendering engine 216 may convert fewer of the draw commands that are in the intermediate format into a final format that is understood by GPU 112. The number of draw commands may be reduced by using a previously rendered texture that is stored in local GPU memory 114 and that matches a portion of the frame to be rendered.

1. Identify a Common Portion

Figure 4B:
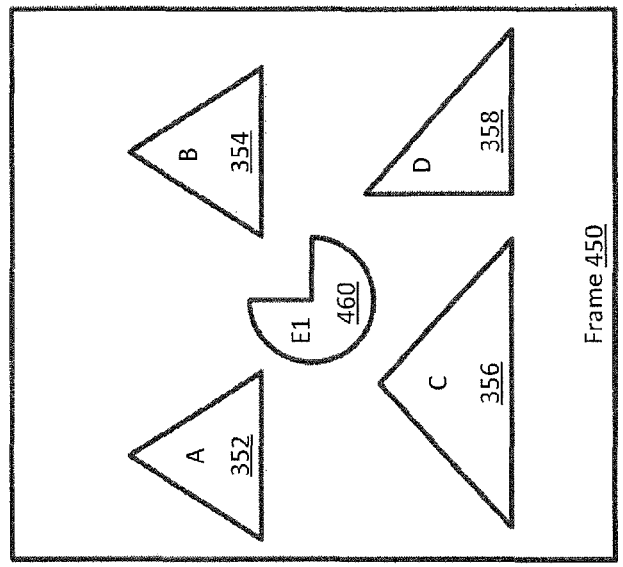
FIG. 4B is an illustration of objects rendered in a frame, according to some embodiments.
Figure 4A:
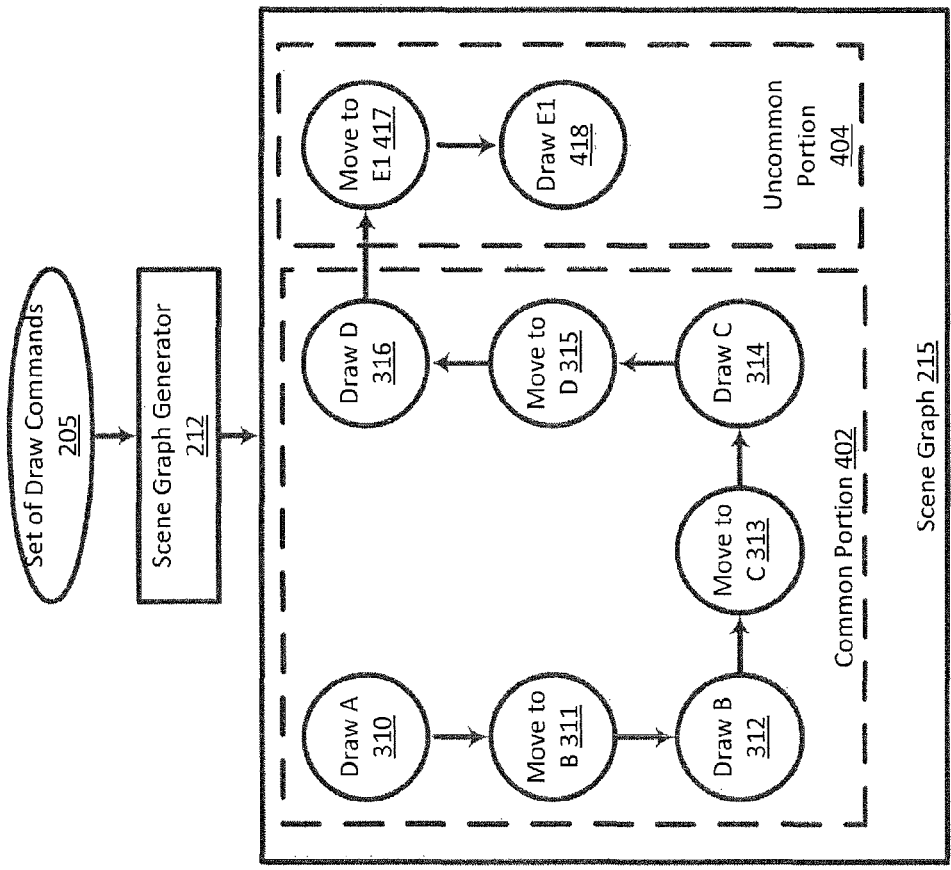
FIG. 4A is an illustration of a scene graph based on a set of draw commands, according to some embodiments.

FIG. 4A is an illustration of scene graph 215 based on a set of draw commands 205, according to some embodiments. FIG. 4B is an illustration of objects rendered in a frame 450, according to some embodiments. Frame 450 includes object "A" 352, object "B" 354, object "C" 356, object "D" 358, and object "E1" 460. In scene graphs 213 and 215, each of objects "A" 352, "B" 354, "C" 356, and "D" 358 is respectively of the same shape and rendered at the same location on display 118. In this example, nodes 310-316 may have a common attribute "shape" that has the same value in scene graphs 213 and 215, respectively, and may have a common attribute "location" that has the same value in scene graphs 213 and 215, respectively.

In keeping with the above example, GPU 112 has rendered frame 350 (FIG. 3B) on display 118 and scene graph 213, updated scene graph 328, and/or scene graph 215 are stored in local GPU memory 114. Scene graphs 213 and 215 are rendered in sequential frames. Frame 450 in FIG. 4B is the next sequential frame to be rendered after frame 350 on display 118. As shown in FIG. 4A, scene graph generator 212 may process set of draw commands 205 and generate scene graph 215 containing nodes 310-316 and 417-418 based on set of draw commands 205. Nodes 310-316 and 417-418 include draw commands and/or data associated with the draw commands. Each node in scene graph 215 has one or more attributes corresponding to an object for rendering in frame 450. Set of draw commands 205 may be the current set of draw commands for rendering in the next frame.

Optimizer 214 may compare nodes included in current scene graph 215 with nodes included in previous scene graph 213 to identify commonalities among the nodes across frames. If a node in scene graph 213 has the same attribute value for one or more common attributes as a node in scene graph 215, those two nodes may be determined to have a commonality and may be referred to as matching nodes. Optimizer 214 identifies a first set of nodes 310-318 in scene graph 213 and a second set of nodes 310-316 and 417-418 in scene graph 215, and compares attribute values of one or more common attributes of one or more nodes in the first set of nodes with one or more nodes in the second sets of nodes. Optimizer 214 may determine that nodes 310-316 in previous scene graph 213 and nodes 310-316 in current scene graph 215 are the same shape (e.g., their attribute values for the attribute "shape" are the same) and have the same location (e.g., their attribute values for the attribute "location" are the same), respectively, and thus have one or more commonalities.

In the example illustrated in FIG. 4A, optimizer 214 identifies, based on the comparison, a common portion 402 of the current scene graph 215 including a plurality of nodes that match nodes in the previous scene graph 213. Optimizer 214 may also identify an uncommon portion 404 of scene graph 215 including a plurality of nodes that do not match nodes in the previous scene graph 213. Common portion 402 includes nodes 310-316 in current scene graph 215 that are the same as nodes 310-316 in previous scene graph 213. For example, node 310 in the previous scene graph 213 matches node 310 in the current scene graph 215, node 311 in the previous scene graph 213 matches node 311 in the current scene graph 215, and so on. As such, nodes 310-316 in the current scene graph 215 may represent one or more objects having the same shape and location on display 118 as nodes 310-316 in the previous scene graph 213, respectively, and the objects represented by these nodes do not change from one frame (frame 350) to the next frame (frame 450).

2. Store a Single Texture that Represents the Nodes in the Common Portion

In response to determining that a common portion of frames 350 and 450 match, optimizer 214 identifies the subsection of draw commands included in the common portion and rendering engine 216 executes the subsection of draw commands to generate a single texture 262 (see FIG. 2). The common portion corresponds to a plurality of nodes in scene graph 213 that matches with a plurality of nodes in scene graph 215, respectively. For example, optimizer 214 may identify the subsection of draw commands included in the matching plurality of nodes and rendering engine 216 may execute the subsection of draw commands to generate single texture 262. Rendering engine 216 stores the single texture 262 in local GPU memory 114 to be used at a later point in time to optimize the rendering of subsequent frames and maintains a pointer 242 to texture 262. In an example, a frame that is rendered subsequent to frame 450 may include the plurality of nodes identified in the common portion of frames 350 and 450. In this example, the multiple draw calls and the data associated with the draw calls (e.g., move instructions) included in the plurality of matching nodes (e.g., nodes 310-316) may be replaced with a single draw command with the pre-generated single texture 262.

Additionally, optimizer 214 may recognize that nodes 310 and 312 in the current scene graph 215 match nodes 310 and 312 in the previous scene graph 213, respectively. Accordingly, optimizer 214 may update the current scene graph 215 by replacing nodes 310 and 312 in the current scene graph 215 with a single node 330 that instructs GPU 112 to retrieve single texture 260 from local GPU memory 114. Single node 330 represents object "A" 352, Optimizer 214 sends the updated scene graph to rendering engine 216, which receives the updated scene graph and converts the intermediate draw commands included in the updated scene graph into final draw commands that are understandable by GPU 112.

GPU 112 receives the final draw commands and retrieves, based on the draw command in node 330, single texture 260 from local GPU memory 114 and renders this single texture in frame 450 at two different locations on display 118, thus reducing the memory bandwidth for data transfer between CPU 106 and GPU 112 and also reducing CPU cycles. Node 330 may include pointer 240 to texture 260. GPU 112 also executes the final draw commands converted by rendering engine 216 and based on nodes 311, 313-316, and 417-418, thus rendering the appropriate objects in frame 450. FIG. 4B is an illustration of frame 450 that is rendered based on updating scene graph 215, where the updated scene graph includes a single draw command representing the multiple draw commands for drawing object "A" 352 and object "B" 354, in accordance with some embodiments.

3. Retrieve the Single Texture from Local GPU Memory in Subsequent Frames

Figure 5B:
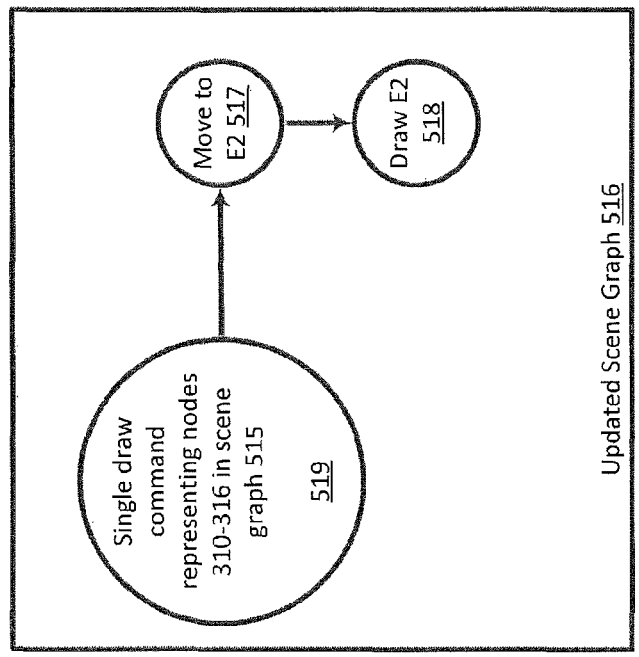
FIG. 5B is an illustration of an updated scene graph based on replacing matching nodes in the scene graph in FIG. 5A with a single node, according to some embodiments.
Figure 5A:
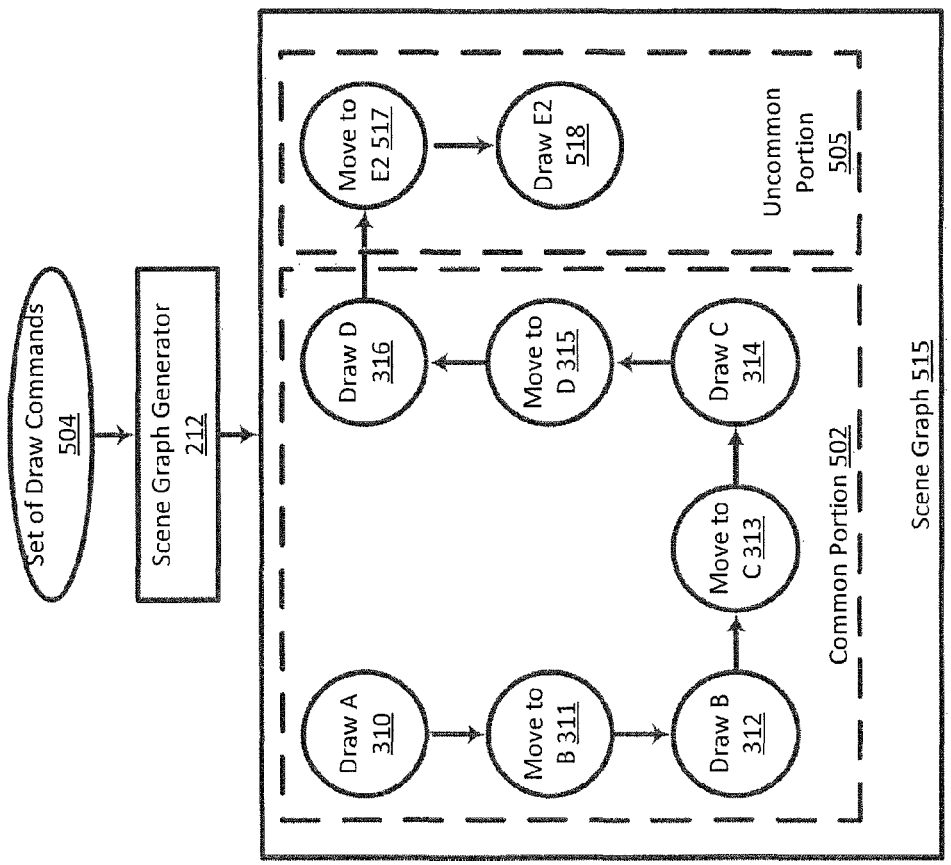
FIG. 5A is an illustration of a scene graph based on a set of draw commands, according to some embodiments.
Figure 5C:
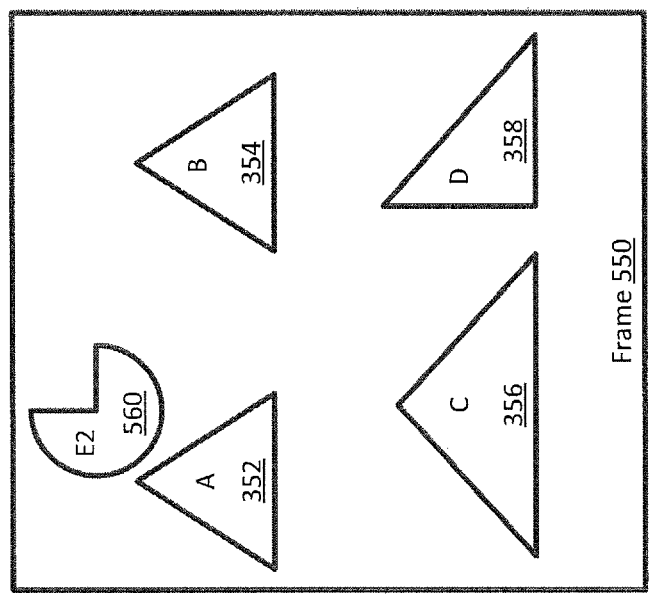
FIG. 5C is an illustration of objects rendered in a frame based on the updated scene graph in FIG. 5B, according to some embodiments.

FIG. 5A is an illustration of a scene graph 515 based on set of draw commands 504, according to some embodiments. FIG. 5B is an illustration of an updated scene graph 516 based on replacing matching nodes in the scene graph in FIG. 5A with a single node, according to some embodiments. FIG. 5C is an illustration of objects rendered in a frame 550 based on updated scene graph 516, according to some embodiments. Frames 350 (see FIG. 3B), 450 (see FIG. 4B), and 550 (see FIG. 5) may be sequential frames that are displayed in display 118. As discussed, portions of sequential frames may remain the same.

In keeping with the above example in which GPU 112 has rendered frames 350 and 450, scene graph 215 may now be considered the previous scene graph and scene graph 515 may be considered the current scene graph. Using the techniques in the present disclosure, optimizer 214 may compare the nodes in the previous scene graph 215 with nodes in the current scene graph 515 to identify a common portion including a plurality of nodes that remain the same across the scene graphs. Optimizer 214 may determine that nodes 310-316 in the current scene graph 515 are the same as nodes 310-316 in the previous scene graph 215. Accordingly, optimizer 214 may identify a common portion 502 including a plurality of nodes (nodes 310-316) that match a plurality of nodes in common portion 402 in scene graph 215. Optimizer 214 may also identify an uncommon portion 505 including a plurality of nodes that do not match a plurality of nodes in scene graph 215.

Optimizer 214 determines that the draw commands included in nodes 310-316 are represented by texture 262 stored in local GPU memory 114 (see FIG. 2). FIG. 5B is an illustration of an updated scene graph based on replacing matching nodes in scene graph 515 with a single node 519, according to some embodiments. In FIG. 5B, optimizer 214 may generate an updated scene graph 516 by replacing nodes 310-316 in the current scene graph 515 with a single node 519. In doing so, the draw commands included in nodes 310-316 may be replaced with a single draw command with the pre-generated texture 262. Node 519 includes the single draw command with the pre-generated texture 262 and may include a pointer to the address at which texture 262 is stored in local GPU memory 114. Optimizer 214 may store scene graph 515 and/or updated scene graph 516 into system memory 110. Optimizer 214 sends updated scene graph 516 to rendering engine 216 to convert the intermediate draw commands included in updated scene graph 516 into final draw commands that are understandable by GPU 112. Updated scene graph 516 contains fewer nodes than scene graph 515.

Rendering engine 216 receives updated scene graph 516 and converts the intermediate draw commands included in the updated scene graph into final draw commands that are understandable by GPU 112. FIG. 5C is an illustration of objects rendered in a frame 550 based on updated scene graph 516 in FIG. 5B, according to some embodiments. GPU 112 may render frame 550 based on the single draw call in node 519 and the draw call and associated data in nodes 517 and 518. GPU 112 receives the final draw commands and retrieves, based on the draw command in node 519, single texture 262 from local GPU memory 114 and renders this single texture in frame 550, thus reducing the memory bandwidth for data transfer between CPU 106 and GPU 112 and also reducing CPU cycles. The display of single texture 262 provides for the display of objects "A" 352, "B" 354, "C" 356, and "D" 358. GPU 112 also executes the final draw commands included in nodes 517 and 518 in updated scene graph 516 and thus renders the appropriate object(s) (object "E2" 560) in frame 550. In some examples, portions of texture 262 are transparent such that it does not matter whether texture 262 or object "E" 560 is rendered in frame 550 first.

As discussed above and further emphasized here, FIGS. 1, 2, 3A-3C, 4A, 4B, and 5A-5C are merely examples, which should not unduly limit the scope of the claims.

IV. Example Method

Figure 6:
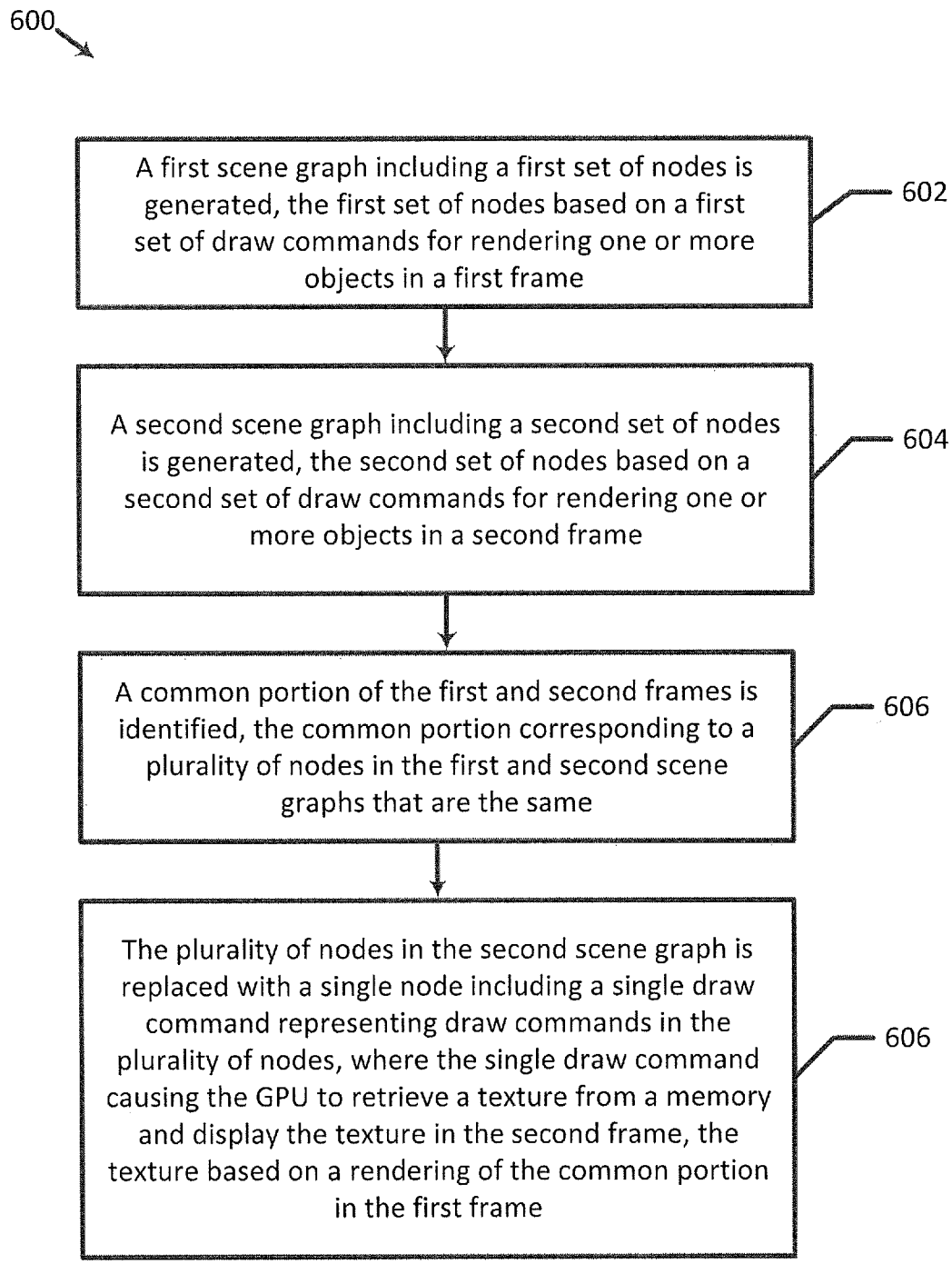
FIG. 6 is a simplified flowchart illustrating a method of reducing a number of draw commands issued to the GPU, according to some embodiments.

FIG. 6 is a simplified flowchart illustrating a method 600 of reducing a number of draw commands issued to a GPU, according to some embodiments. Method 600 is not meant to be limiting and may be used in other applications.

Method 600 includes blocks 602-608. In a block 602, a first scene graph including a first set of nodes is generated, the first set of nodes based on a first set of draw commands for rendering one or more objects in a first frame. In an example, scene graph generator 212 generates scene graph 215 including nodes 310-316 and 417-418, which are based on set of draw commands 205 for rendering one or more objects in frame 450. In a block 604, a second scene graph including a second set of nodes is generated, the second set of nodes based on a second set of draw commands for rendering one or more objects in a second frame. In an example, scene graph generator 212 generates scene graph 515 including nodes 310-316 and 517-518, which are based on set of draw commands 504 for rendering one or more objects in frame 550.

In a block 606, a common portion of the first and second frames is identified, the common portion corresponding to a plurality of nodes in the first and second scene graphs that are the same. In an example, optimizer 214 identifies a common portion of frames 450 and 550, the common portion corresponding to nodes 310-316 in scene graphs 215 and 515 that are the same.

In a block 608, the plurality of nodes in the second scene graph is replaced with a single node including a single draw command representing draw commands in the plurality of nodes, where the single draw command causes the GPU to retrieve a texture from a memory and display the texture in the second frame, and where the texture is based on a rendering of the common portion in the first frame. In an example, optimizer 214 replaces nodes 310-316 in scene graph 515 with single node 519 including a single draw command representing draw commands in nodes 310-316, where the single draw command causes GPU 112 to retrieve texture 262 from local GPU memory 114 and display texture 262 in frame 550, and where texture 262 is based on a rendering of the common portion in frame 450.

In some embodiments, blocks 602-608 may be performed for any sets of draw commands or rendered frames. It is also understood that additional processes may be performed before, during, or after blocks 602-608 discussed above. It is also understood that one or more of the blocks of method 600 described herein may be omitted, combined, or performed in a different sequence as desired.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The blocks or actions of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of reducing a number of draw commands issued to a graphics processing unit (GPU), comprising:
   generating a first scene graph including a first set of nodes, the first set of nodes based on a first set of draw commands for rendering one or more objects in a first frame;
   generating a second scene graph including a second set of nodes, the second set of nodes based on a second set of draw commands for rendering one or more objects in a second frame;
   identifying a common portion of the first and second frames, the common portion corresponding to a plurality of nodes in the first and second scene graphs that are the same;
   rendering the common portion into a texture;
   storing the texture in a memory; and
   replacing the plurality of nodes in the second scene graph with a single node including a single draw command causing the GPU to retrieve the texture from the memory and display the texture in the second frame.

2. The method of claim 1, further comprising:
   generating a third scene graph including a third set of nodes, the third set of nodes based on a third set of draw commands for rendering one or more objects in a third frame, wherein the third frame, first frame, and second frame are sequentially rendered; and
   identifying the common portion of the first and third frames, the common portion corresponding to the plurality of nodes in the first and third scene graphs that are the same, the texture based on a rendering of the common portion in the first frame.

3. The method of claim 1, wherein the memory is a local GPU memory.

4. The method of claim 1, wherein the second scene graph is updated based on replacing the plurality of nodes in the second scene graph with the single node, the method further comprising:
   sending the updated second scene graph to a rendering engine, wherein the updated second scene graph includes a third set of draw commands.

5. The method of claim 4, further comprising:
   converting, at the rendering engine, the third set of draw commands to a fourth set of draw commands understandable by the GPU.

6. The method of claim 1, wherein each node in the first and second sets of nodes includes one or more attributes associated with a draw command, and wherein identifying the common portion of the first and second frames further comprises:
   comparing attribute values of one or more common attributes of the first and second sets of nodes;
   determining, based on comparing attribute values of the first and second sets of nodes, that a first subset of nodes in the first set of nodes and a second subset of nodes in the second set of nodes are the same if an attribute value of each attribute in the first subset of nodes is the same as in the second subset of nodes; and determining, based on comparing attribute values of the first and second sets of nodes, that the first and second subsets of nodes are not the same if an attribute value of an attribute in the first subset of nodes is not the same as in the second subset of nodes.

7. The method of claim 1, wherein each node in the first and second sets of nodes includes one or more attributes associated with a draw command, further comprising:
comparing attribute values of one or more common attributes of the second set of nodes;
determining, based on comparing attribute values of the second set of nodes, whether a second plurality of nodes has a commonality; and
in response to determining that the second plurality of nodes has a commonality, replacing the second plurality of nodes in the second scene graph with a second single node including a second single draw command representing draw commands in the second plurality of nodes,
the second single draw command causing the GPU to retrieve a second single texture from a second memory and display the second single texture in the second frame, the second single texture based on a rendering of a node of the second plurality of nodes in the second frame.

8. The method of claim 7, wherein nodes in the second plurality of nodes having a commonality represent an object having the same shape.

9. The method of claim 8, wherein nodes in the second plurality of nodes have a commonality, the method further comprising:
rendering, at a rendering engine, a node of the second plurality of nodes into the second single texture; and
storing the second single texture into the second memory.

10. The method of claim 8, wherein nodes in the second plurality of nodes have a commonality, the method further comprising:
providing a plurality of locations at which to draw the object on a display.

11. A system for reducing a number of draw commands issued to a graphics processing unit (GPU), comprising:
a scene graph generator that generates a first scene graph and a second scene graph, wherein the first scene graph includes a first set of nodes based on a first set of draw commands for rendering one or more objects in a first frame, and wherein the second scene graph includes a second set of nodes based on a second set of draw commands for rendering one or more objects in a second frame; and
an optimizer that identifies a common portion of the first and second frames, renders the common portion into a texture, stores the texture in a memory, and replaces a plurality of nodes in the second scene graph with a single node including a single draw command representing draw commands in the plurality of nodes, wherein the common portion corresponds to the plurality of nodes in the first and second scene graphs that are the same, and
wherein the single draw command causes the GPU to retrieve the texture from the memory and display the texture in the second frame.

12. The system of claim 11,
wherein the scene graph generator generates a third scene graph including a third set of nodes based on a third set of draw commands for rendering one or more objects in a third frame, wherein the third frame, first frame, and second frame are sequentially rendered, and
wherein the optimizer identifies the common portion of the first and third frames, wherein the common portion corresponds to the plurality of nodes in the first and third scene graphs that are the same, and the texture is based on a rendering of the common portion in the first frame.

13. The system of claim 11, wherein the memory is a local GPU memory.

14. The system of claim 11, wherein the optimizer updates the second scene graph by replacing the plurality of nodes in the second scene graph with the single node, and wherein the optimizer sends the updated second scene graph to a rendering engine.

15. The system of claim 14, wherein the updated second scene graph includes a third set of draw commands, and wherein the rendering engine converts the third set of draw commands to a fourth set of draw commands understandable by the GPU.

16. The system of claim 11, wherein each node in the first and second sets of nodes includes one or more attributes associated with a draw command, wherein the optimizer compares attribute values of one or more common attributes of the second set of nodes and determines, based on comparing attribute values of the second set of nodes, whether a second plurality of nodes has a commonality, wherein in response to determining that the second plurality of nodes has a commonality, the optimizer replaces the second plurality of nodes in the second scene graph with a second single node including a second single draw command representing draw commands in the second plurality of nodes, wherein the second single draw command causes the GPU to retrieve a second single texture from a second memory and display the second single texture in the second frame, and wherein the second single texture is based on a rendering of a node of the second plurality of nodes in the second frame.

17. The system of claim 16, wherein nodes in the second plurality of nodes having a commonality represent an object having the same shape.

18. The system of claim 17, wherein nodes in the second plurality of nodes have a commonality, further comprising:
a rendering engine that renders a node of the second plurality of nodes into the second single texture and stores the second single texture into the second memory.

19. A non-transitory computer-readable medium having stored thereon computer-executable instructions for performing operations, comprising:
generating a first scene graph including a first set of nodes, the first set of nodes based on a first set of draw commands for rendering one or more objects in a first frame;
generating a second scene graph including a second set of nodes, the second set of nodes based on a second set of draw commands for rendering one or more objects in a second frame;
identifying a common portion of the first and second frames, the common portion corresponding to a plurality of nodes in the first and second scene graphs that are the same;
rendering the common portion into a texture;
storing the texture in a memory; and
replacing the plurality of nodes in the second scene graph with a single node including a single draw command causing the GPU to retrieve the texture from the memory and display the texture in the second frame.

20. The non-transitory computer-readable medium of claim 19, the operations further comprising:
  generating a third scene graph including a third set of nodes, the third set of nodes based on a third set of draw commands for rendering one or more objects in a third frame, wherein the third frame, first frame, and second frame are sequentially rendered; and
  identifying the common portion of the first and third frames, the common portion corresponding to the plurality of nodes in the first and third scene graphs that are the same, the texture based on a rendering of the common portion in the first.

* * * * *